US012596329B2

(12) United States Patent
Lin et al.

(10) Patent No.: US 12,596,329 B2
(45) Date of Patent: Apr. 7, 2026

(54) HOLOGRAPHIC PROJECTOR

(71) Applicant: Envisics Ltd, Milton Keynes (GB)

(72) Inventors: Ruisheng Lin, Milton Keynes (GB);
Timothy Smeeton, Milton Keynes
(GB); Jamieson Christmas, Milton
Keynes (GB)

(73) Assignee: Envisics Ltd, Milton Keynes (GB)

( * ) Notice: Subject to any disclaimer, the term of this
patent is extended or adjusted under 35
U.S.C. 154(b) by 366 days.

(21) Appl. No.: 18/495,523

(22) Filed: Oct. 26, 2023

(65) Prior Publication Data

US 2024/0231275 A1    Jul. 11, 2024

(30) Foreign Application Priority Data

Jan. 6, 2023    (GB) ..................................... 2300197

(51) Int. Cl.
G03H 1/22        (2006.01)
G03H 1/00        (2006.01)

(52) U.S. Cl.
CPC ... G03H 1/2249 (2013.01); G03H 2001/0088
(2013.01); G03H 2222/53 (2013.01); **G03H
2240/61** (2013.01)

(58) Field of Classification Search
None
See application file for complete search history.

(56) References Cited

U.S. PATENT DOCUMENTS 9,766,456 B2    9/2017    Christmas et al.

<table>
<tr><td>9,915,825 B2</td><td>3/2018</td><td>Robbins et al.</td><td></td></tr>
<tr><td>11,262,587 B2 *</td><td>3/2022</td><td>Rubin ................</td><td>G02B 27/0172</td></tr>
<tr><td>11,275,243 B2</td><td>3/2022</td><td>Chang et al.</td><td></td></tr>
</table>

(Continued)

FOREIGN PATENT DOCUMENTS

WO        2019/058137 A1    3/2019

OTHER PUBLICATIONS

Alexander Laskin et al.; "Beam shaping for holographic techniques"; Photonic Fiber and Crystal Devices: Advances in Materials and Innovations in Device Applications VIII; vol. 9200, pp. 1-8; SPIE, 2014.

(Continued)

*Primary Examiner* — Jyotsna V Dabbi

(74) *Attorney, Agent, or Firm* — McDonnell Boehnen
Hulbert & Berghoff LLP

(57)            ABSTRACT

A holographic projector includes an illumination system arranged to illuminate a hologram displayed on the pixel area of a spatial light modulator to form a holographic wavefront, and further includes a waveguide including an input port arranged to receive the holographic wavefront and a pair of opposing surfaces arranged to waveguide the holographic wavefront. A first surface of the pair of opposing surfaces is partially reflective-transmissive such that a plurality of replicas of the holographic wavefront are emitted therefrom. The illumination system includes a light source arranged to emit diverging light and a first collimating lens arranged to collimate the light. The collimated light has a varying intensity profile, in at least one dimension. The illumination system is configured such that the pixel area is contained within an area delineated by the width of the intensity profile of the collimated light at half the maximum intensity of said intensity profile.

20 Claims, 9 Drawing Sheets

(56)  References Cited

U.S. PATENT DOCUMENTS

| | | | |
|---|---|---|---|
| 2006/0119951 A1* | 6/2006 | McGuire | G02B 27/1026 |
| | | | 359/630 |
| 2012/0002256 A1 | 1/2012 | Lacoste | |
| 2018/0203230 A1* | 7/2018 | Vallius | G02B 27/0172 |
| 2022/0060667 A1 | 2/2022 | Christmas | |
| 2022/0179360 A1 | 6/2022 | Leister et al. | |
| 2022/0252879 A1 | 8/2022 | Christmas et al. | |
| 2022/0404770 A1 | 12/2022 | Christmas et al. | |
| 2022/0413283 A1 | 12/2022 | Marshall | |
| 2023/0064690 A1 | 3/2023 | Smeeton et al. | |
| 2023/0204953 A1 | 6/2023 | Smeeton et al. | |

OTHER PUBLICATIONS

UKIPO Combined Search and Examination Report under Sections 17 and 18(3), Application No. GB2300197.7, mailed Jul. 3, 2023, 6 pages.
Martín-Badosa, Estela, Mario Montes-Usategui, A. Carnicer, J. Andilla, E. Pleguezuelos, and I. Juvells. "Design strategies for optimizing holographic optical tweezers set-ups." Journal of optics A: pure and applied optics 9, No. 8 (2007): S267.

* cited by examiner

300

540

520

526b 524b    524a

526a

522

530 y
x
z 601    603

HOLOGRAPHIC PROJECTOR

CROSS-REFERENCE TO RELATED APPLICATIONS

This application claims the benefit of priority of United Kingdom Patent Application No. 2300197.7 filed Jan. 6, 2023, which is hereby incorporated herein by reference in its entirety.

FIELD

The present disclosure relates to an image projector and image projection. More specifically, the present disclosure relates a holographic projector comprising an illumination system arranged to substantially uniformly illuminate a hologram on a display device such as a spatial light modulator. Some embodiments relate to a picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In overview, an image projection system and method are provided that avoid the creation of dark lines in an image, projected by the image projection system, as seen by a viewer. The image projection system may be a holographic projection system. For example, it may be configured for direct holography, in which light of the hologram—i.e., light encoded by the hologram, which has not yet been transformed into a holographic reconstruction (i.e., into an image)—is channelled to the viewer. The image projection system comprises a display device on which the hologram is displayed, an illumination system for illuminating the display device and causing it to output a holographic wavefront, and a waveguide or other pupil expander for expanding (i.e., replicating) the wavefront output by the display device, before the light of the hologram reaches the viewer. The illumination system comprises a light source that outputs diverging light and a collimator, such as a lens, for collimating the light before it reaches the display device.

In a departure from conventional practice, the concept disclosed herein employs a collimator (e.g., a lens) that causes an area much larger than a display area of the display device to be illuminated by the collimated light, when the collimated light reaches the display plane, at which the display device is located. This may be referred to as heavily over-filling, or heavily over-illuminating, the display device. Therefore, a significant amount of light is, in effect, wasted, as it is not used to illuminate the hologram. Conventionally, such an arrangement would not be adopted, as on face value it wastes a significant amount of power/energy. However, the inventors have found that it addresses other issues, which specifically occur when a replicator is used to form an array of hologram replicas, and so on balance is a net-positive solution.

Heavily over-illuminating the display device, according to the present disclosure, reduces or even eliminates the occurrence of lower-intensity, high-contrast dark lines—that a user would otherwise see in the image, particularly if that image is formed by direct holography. The solution disclosed herein can reduce or even eliminate the occurrence of such dark lines.

The inventors have gone against conventional practice by increasing the focal length (and, therefore, usually the size) of the lens or other collimator employed in an image projection system, to be significantly larger than the focal length (and size) that would be conventionally required to ensure that each pixel of the display device is illuminated. They have done so because they recognised that having an illuminating beam that has a varying profile of light intensity in at least one dimension has a surprisingly significant detrimental effect on the images that a user sees, when those images are formed via direct holography and when the holographic projection system includes a waveguide or other replicator. This phenomenon of dark lines is not seen in all types of image projection systems and it is surprising that beam uniformity has such a detrimental effect on images seen by a viewer in a system that uses direct holography and a waveguide. The waveguide/s of the present disclosure effectively produce a regular array of hologram replicas upstream thereof, as described in the detailed description of embodiments that follows. The inventors found that small decreases in intensity at the edges of the light spot that illuminates the hologram resulted in the formation of extended bands or contours of contrast (where the replicas adjoin) which are visible from the eye-box. Significantly, these bands or contours are substantially straight (and substantially aligned/parallel with the two orthogonal directions of hologram replication). Whilst this banding was extremely subtle (in terms of intensity), the human eye is very sensitive to edge and line features (i.e. straight-line contrast) and the negative impact on the quality of the viewing experience was therefore surprisingly high. That is, the extended straight-line bands or contours—resulting from the regular pattern of hologram replication and "normal" non-uniformities of the source light which are completely acceptable for other types of holographic display—were surprisingly prominent to some human viewers. The inventors observed that the significance of this banding could not easily be appreciated using simple photography (although some photographs are included herein to aid the disclosure) which confirmed that the phenomenon was owing to a particular sensitivity of the human viewing, and image processing, system. Whilst some of the optical phenomenon described above are known per se in the art, the significance on the viewing experience was highly unexpected and difficult to root cause. Furthermore, the solution identified by the inventors is contrary to significant prejudice in the field.

The inventors have proposed a solution that balances addressing the issue of dark lines with maintaining a high level of image resolution and hologram robustness. Moreover, the solution can be implemented as part of a cost-benefit analysis, in which the advantages of addressing/eliminating dark lines is balanced against the possible inefficiencies and cost/bulk implications of using a collimator that is bigger, and an optical path length that is longer, than is usually employed, for a given image projection system.

According to an aspect, a holographic projector is provided comprising an illumination system arranged to illuminate a hologram displayed, on the pixel area of a spatial light modulator (SLM) to form a holographic wavefront. The holographic projector further comprises a waveguide comprising an input port arranged to receive the holographic wavefront and a pair of opposing surfaces arranged to waveguide the holographic wavefront therebetween, wherein a first surface of the pair of opposing surfaces is partially reflective-transmissive such that a plurality of replicas of the holographic wavefront are emitted therefrom. The illumination system comprises a light source arranged to emit diverging light and a first collimating lens arranged to collimate the light. The illumination system is configured such that the pixel area is contained within an area delineated by a width of the intensity profile of the collimated light as measured at half the maximum intensity of said intensity profile, at the display plane. In some embodiments, the illumination system may be said to be configured such that the pixel area is contained within an area delineated by the full width at half maximum, "FWHM", of the intensity profile of the collimated light, at the display plane.

As a result, a significant portion of the light of the illuminated beam may not be incident on the pixel area of the SLM resulting in a loss of optical energy. For example, at least half of the light of the illuminating beam will not be incident on the pixel area of the SLM, thus resulting in significant loss of optical energy. This is unconventional, but has found to be a net-beneficial solution, for addressing holographic image quality as described in detail herein.

The collimated light may have a varying spatial (intensity) profile, in at least one dimension.

The holographic projector may be configured for direct-view holography, in which light of the hologram (not light of a holographic reconstruction) is directed into a viewer's eyes. The waveguide may be a two-dimensional waveguide.

Because a waveguide is used to replicate the holographic wavefront, an array of replicas of that wavefront will, in effect, be created upstream of the viewer. By being configured such that the pixel area, on which the hologram is displayed, is contained within an area delineated by the width at half maximum of the intensity profile (or the full width at half maximum, "FWHM", of the intensity profile) of the collimated light, at the display plane, the illumination system ensures that all of the hologram will be illuminated by light that is at least half the intensity of the maximum possible intensity of the collimated light. Any light which is less bright than half the maximum intensity will fall outside of the pixel area, and so will not be used to illuminate the hologram. This means that, when the two-dimensional array of replicas is formed, by the waveguide, the formation of dark lines along the borders at which two or more replicas meet is avoided. This, in turn, means that the viewer will not detect a grid of such dark lines, or bands, in the resulting image, when the light is channeled to the viewer's eye.

The intensity of the collimated light typically varies in one or two (spatial) dimensions, when viewed in cross section. The profile, or intensity contours, of the light intensity may have any suitable shape. For example, they may have a substantially Gaussian shape. The profiles may be smooth, or may be step-wise profiles.

The first collimating lens may have a first focal length F1, wherein said first focal length F1 is greater than a second focal length F2, wherein the second focal length F2 comprises the minimum focal length required to illuminate the entire pixel area using collimated light from a lens located at the position at which the first collimating lens is (or, will be) located. In other words, the first collimating lens may be specifically selected and configured to have a longer focal length than is required to just illuminate the pixel area. As a result, the first collimating lens will illuminate a significantly larger area than the pixel area, and so the light within the pixel area will be high-intensity light from a substantially central region of the beam and will not include lower intensity (I.e., dimmer) light at the periphery of the beam profile.

The ratio of the first focal length F1 to the second focal length F2 may be at least approximately 4:3, for example it may be at least approximately 8:5, for example approximately 2:1. Therefore, the first collimating lens may be at least approximately one third larger than the size of a lens needed to just fill the pixel area with collimated light. For example, it may be twice the size of a lens needed to just fill the pixel area with collimated light. Therefore, the lens may be significantly larger than a lens that would be employed for collimating light to illuminate an SLM in a conventional image projection system.

The illumination system may comprise a second collimating lens, wherein the first collimating lens is arranged to collimate light of a first wavelength and wherein the second collimating lens is arranged to collimate light of a second, different wavelength. For example, the first collimating lens may be for collimating red light and the second collimating lens may be for collimating blue and/or green light, or vice versa. The second collimating lens may have a third focal length F3, wherein said third focal length F3 is different to the first focal length F1 and is greater than the second focal length F2. Therefore, both lenses may be bigger than the lenses conventionally used in similar image projection systems.

The partially reflective-transmissive first surface of the waveguide may comprise an output surface.

The display device may comprise any suitable display device, such as a pixelated display device. In embodiments in which it is an SLM, it may comprise a liquid crystal on silicon (LCoS) SLM.

The SLM may comprise a two-dimensional array of pixels that define the pixel area. Because of the heavy over-filling of the SLM with collimated light, the SLM may be configured to display the hologram within a hologram display area that comprises all, or almost all, the pixel area defined by the array of pixels, whilst still ensuring that every pixel is illuminated by light of an acceptably high intensity, and avoiding the appearance of dark lines in the resulting human-viewed image. For example, the hologram display area may comprise at least approximately 75% of the pixel area. For example, the hologram display area may comprise at least approximately 85% of the pixel area. For example, the hologram display area may comprise at least approximately 90% to 95% of the pixel area.

The hologram display area may have a central point that is offset, in at least one dimension, from a central point of the pixel area. In such embodiments, the collimated light (or, a substantially central axis of the collimated light) may be directed to the central point of the hologram.

Alternatively, the hologram display area may have a central point that is co-incident with the central point of the pixel area, even if the hologram does not occupy the entire available pixel area. Therefore, the collimated light (or, a substantially central axis of the collimated light) need not be diverted away from the central point of the display device, where it would conventionally be directed to.

The waveguide may be configured to form a virtual surface comprising the plurality of replicas of the holographic wavefront emitted by the SLM, arranged in an array. The virtual surface may be referred to as being an "extended modulator" or a "replica plane". The virtual surface may be three-dimensional, due to the replicas being slightly offset from one another, in a direction substantially perpendicular to the display plane (i.e., in a direction substantially parallel to the optical axis of the holographic projector), as well as being arranged adjacent one another in each of two dimensions (i.e., in each of the two dimensions of the display plane). By illuminating the hologram, in accordance with the present disclosure, the illumination system ensures that dark bands are not perceived, or at least are substantially reduced.

The illumination system is configured such that the pixel area is contained within an area delineated by the (full) width at (more than) half the maximum of the intensity profile of the collimated light, at the display plane. For example, it may be contained within an area delineated by the (full) width at approximately 75% maximum of the intensity profile of the collimated light, at the display plane. For example, it may be contained within an area delineated by the (full) width at approximately 90%, or more, of the maximum of the intensity profile of the collimated light, at the display plane.

The partially reflective-transmissive first surface of the waveguide may comprise an output surface. The input port of the waveguide may be comprised within a second, input surface. Alternatively, the input port may be comprised at an end of the output surface. The waveguide may comprise an optical slab of transmissive material, or any other suitable waveguide type.

According to an aspect, a method of holographic projection is provided comprising displaying a hologram at a display plane, on the pixel area of a spatial light modulator (SLM), emitting diverging light from a light source, collimating the light using a first collimating lens or other collimator, and illuminating the displayed hologram with the collimated light, to form a holographic wavefront. The method further comprises directing the holographic wavefront through a waveguide, wherein the waveguide comprises an input port arranged to receive the holographic wavefront and a pair of opposing/complementary surfaces arranged to waveguide the holographic wavefront therebetween, wherein a first surface of the pair of opposing surfaces is partially reflective-transmissive such that a plurality of replicas of the holographic wavefront are emitted therefrom. The collimated light has a varying spatial (intensity) profile, in at least one dimension. The method further comprises arranging the light source, first collimating lens and the SLM such that the pixel area is contained within an area delineated by a width of the intensity profile of the collimated light as measured at half the maximum intensity of said intensity profile, at the display plane. In some embodiments, the method further comprises arranging the light source, first collimating lens and the SLM such that the pixel area is contained within an area delineated by the full width at half maximum, "FWHM", of the intensity profile of the collimated light, at the display plane.

The method may comprise direct-view holography, in which light encoded by the hologram is directed into a viewer's eyes. The waveguide may be a two-dimensional waveguide.

According to an aspect, a holographic projector is provided comprising an illumination system arranged to illuminate a hologram displayed, at a display plane, on the pixel area of a spatial light modulator (SLM) to form a holographic wavefront. The holographic projector further comprises a waveguide comprising an input port arranged to receive the holographic wavefront and a pair of opposing surfaces arranged to waveguide the holographic wavefront therebetween, wherein a first surface of the pair of opposing surfaces is partially reflective-transmissive such that a plurality of replicas of the holographic wavefront are emitted therefrom. The illumination system comprises a light source arranged to emit diverging light and a first collimating lens arranged to collimate the light. The collimated light has a varying intensity profile, in at least one dimension. The illumination system is configured such that the waveguide forms an array from two or more of the plurality of replicas of the holographic wavefront.

According to an aspect, a system and method are provided for reducing dark lines in a holographic image, as seen by a (human) viewer. The holographic image is formed using a holographic projection system that comprises an illumination system, which comprises a light source arranged to emit diverging light and a first collimating lens arranged to collimate the light. The illumination system is arranged to illuminate a hologram displayed, at a display plane, on at least a portion of the pixel area of a spatial light modulator (SLM) to form a holographic wavefront. The holographic projector further comprises a waveguide comprising an input port arranged to receive the holographic wavefront and an output surface, arranged to output a plurality of replicas of the holographic wavefront therefrom. The method comprises configuring the first collimating lens to illuminate, with light of at least a predetermined threshold level of intensity (i.e., brightness), an area that is at least the size of the portion of the pixel area that displays the hologram.

The collimated light may have a varying intensity profile, in at least one dimension. The method may comprise direct-view holography, in which light of the hologram is directed to the viewer's eyes, and the viewer forms the image.

The method comprises overfilling the SLM significantly, such that every pixel of the pixel area will be illuminated by light of a high intensity. As a result, the hologram may be displayed on a hologram display area that occupies most of the pixel area, without the resulting image including dark lines. For example, is may occupy between at least 75% and approximately 95% of the pixel area. For example, it may occupy up to approximately 100% of the pixel area.

According to an aspect, a system and method are provided for conducting a cost-benefit analysis for determining a focal length of a collimating lens or other collimator, for a holographic projection system. The holographic projection system comprises an illumination system, which comprises a light source arranged to emit diverging light and (will comprise) a collimating lens arranged to collimate the light. The illumination system is/will be arranged to illuminate a hologram displayed, at a display plane, on at least a portion of the pixel area of a spatial light modulator (SLM) to form a holographic wavefront. The holographic projector further comprises a waveguide comprising an input port arranged to receive the holographic wavefront and an output surface, arranged to output a plurality of replicas of the holographic wavefront therefrom. The method comprises: determining a focal length of a collimator that would provide light of at least a pre-determined level of brightness (i.e., intensity) across at least the portion of the pixel area on which the hologram is/will be displayed; determining at least one of: a size of the required collimator, a cost of the required collimator, and an amount or a cost of the light that would be lost, in the provision of light of at least a pre-determined level of brightness (i.e., intensity) across at least the portion of the pixel area on which the hologram is/will be displayed; determining whether an advantage of the provision of the light of at least the pre-determined brightness, for the reduction of dark lines in the resulting holographic image, is net-beneficial, compared to the disadvantage(s) of doing so, in terms of at least one of: increased bulk of the system, decreased light efficiency, increased financial cost, and so on.

If it is determined that providing the collimator of a focal length that would provide light of at least the pre-determined level of brightness (i.e., intensity) across at least the portion of the pixel area on which the hologram is/will be displayed is net-beneficial, the method may further comprise providing a collimator having that focal length. It may further comprise employing the holographic projection system, including the collimator, to provide holographic images with reduced dark lines. The holographic projection system may be configured for direct holography. The waveguide may be a two-dimensional waveguide.

If it is determined that providing the collimator of a focal length that would provide light of at least the pre-determined level of brightness (i.e., intensity) across at least the portion of the pixel area on which the hologram is/will be displayed is not net-beneficial, the method may be repeated for a different pre-determined level of brightness of light and/or for the display device being configured to display a hologram on a differently-sized portion of its pixel area, in order to change the corresponding focal length of the collimator.

The cost-benefit analysis may be at least partially computer-implemented. A computer program may be provided comprising a set of instructions for carrying out the cost-benefit analysis.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
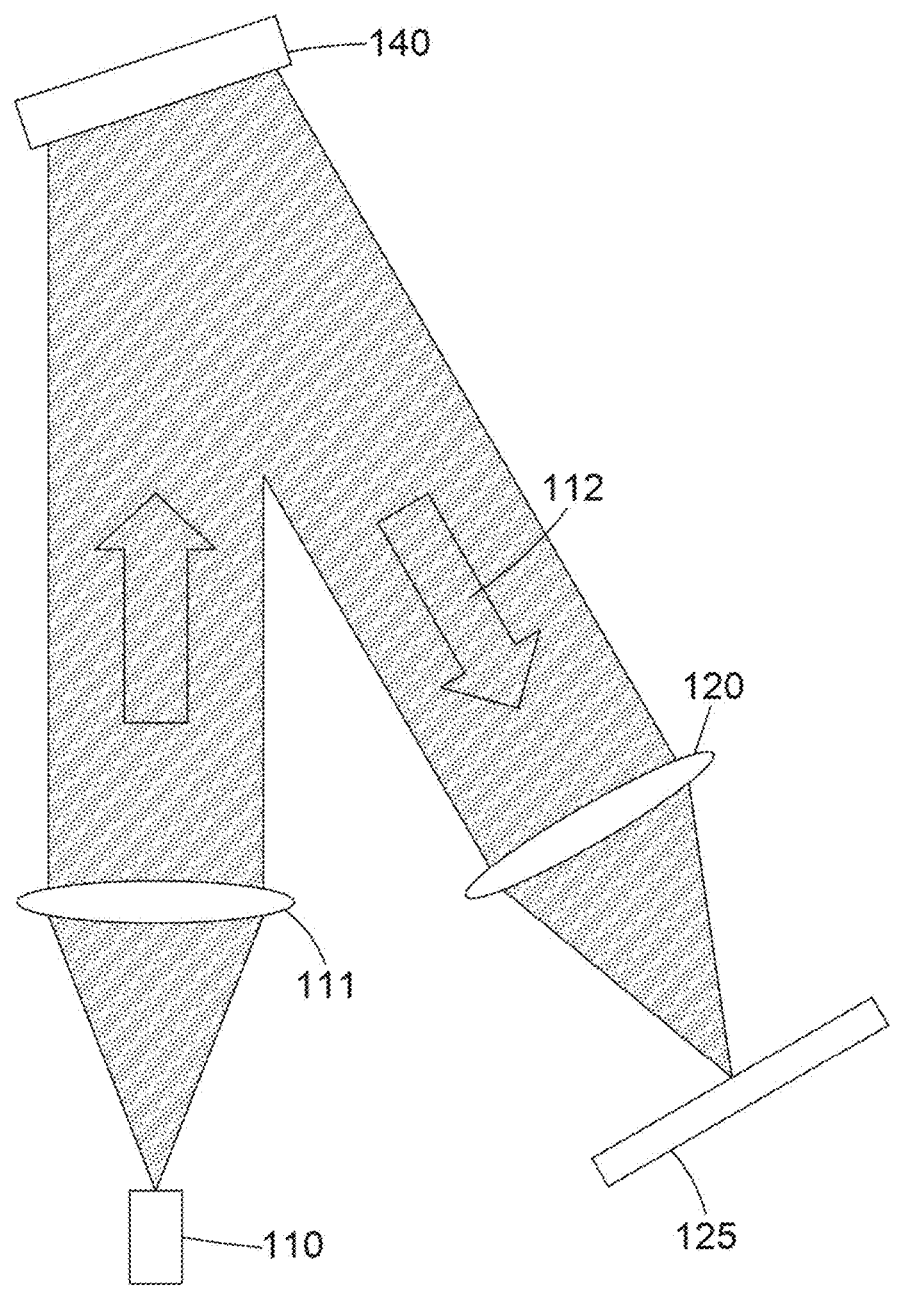
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 (published as GB2614286A) and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
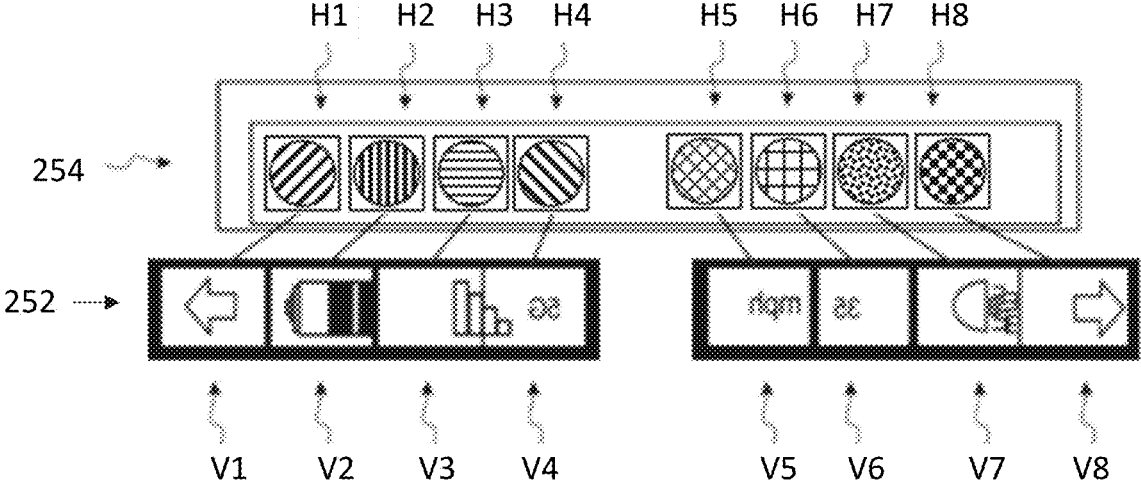
FIG. 2 shows an image for projection comprising eight image areas/components, V1 to V8, and cross-sections of the corresponding hologram channels, H1-H8.
Figure 3:
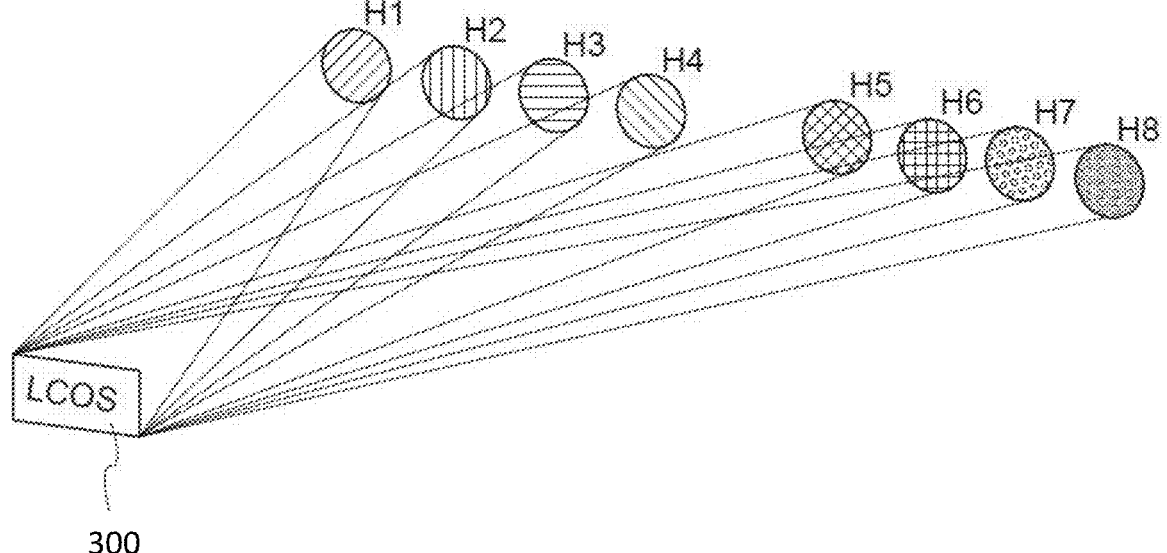
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram, displayed on LCOS 300 in this example, directs light into a plurality of discrete areas (H1 to H8). The discrete areas, H1 to H8, are discs in the example shown but other shapes are envisaged. The size and shape of the optimum disc may, after propagation through the waveguide, be related to the size and shape of an aperture of the optical system such as the entrance pupil of the viewing system.

Figure 4:
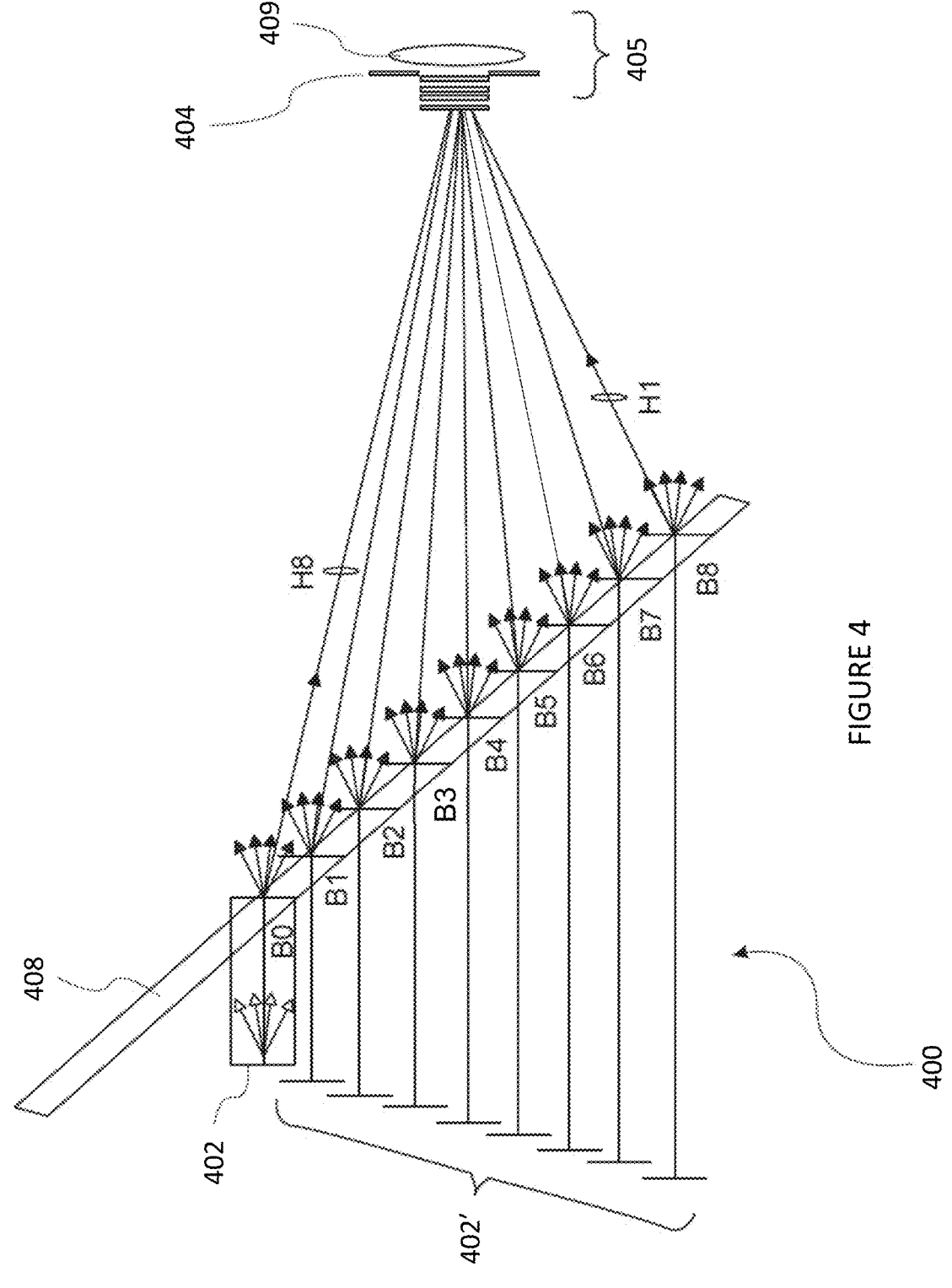
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
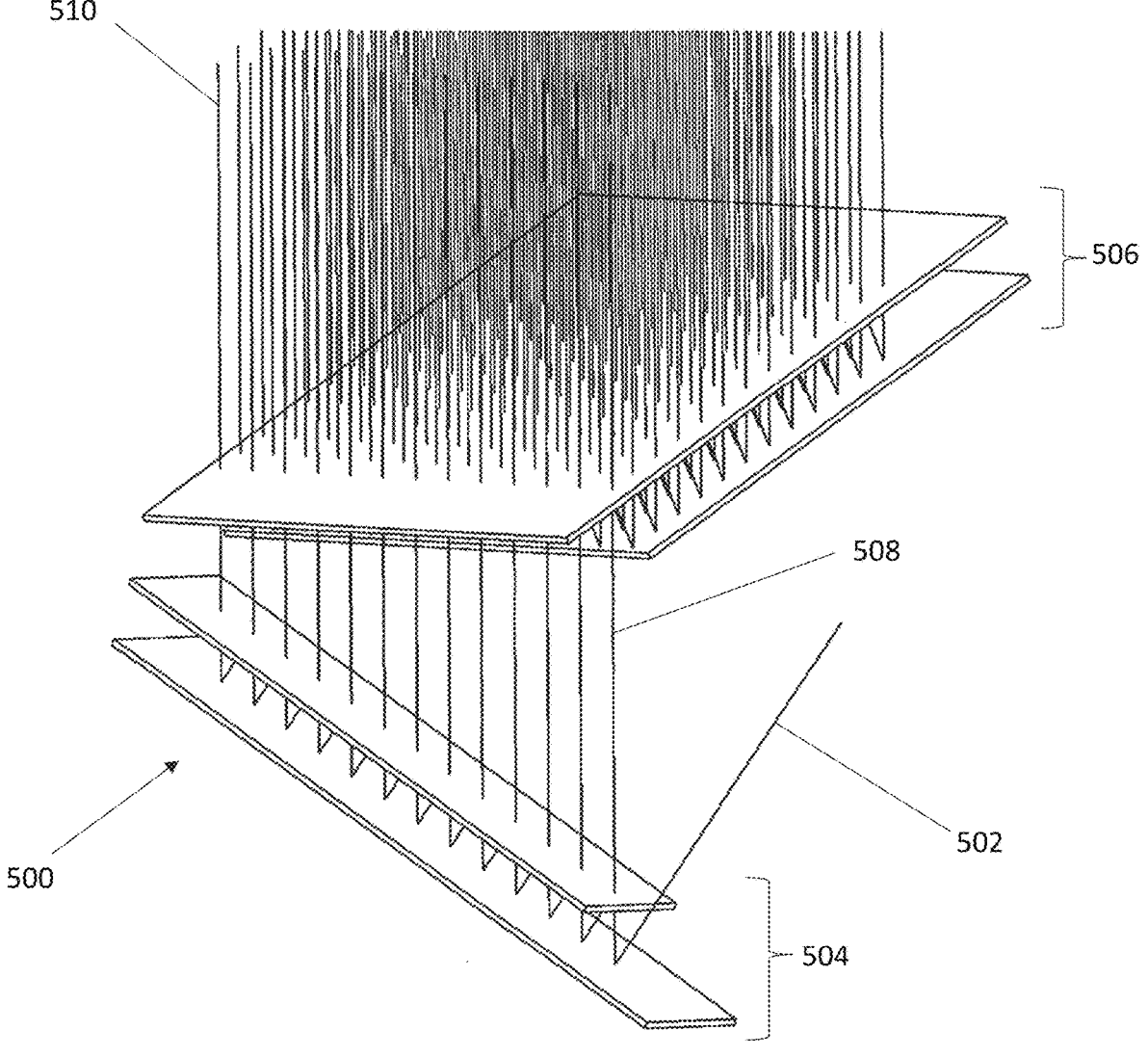
FIG. 5A shows a perspective view of a first example two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
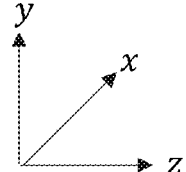
FIG. 5B shows a perspective view of a second example two-dimensional pupil expander comprising two replicators.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Dark Lines of Light in Human-Viewed Holographic Images

As shown by way of non-limiting example inf FIG. 1, an image projection system such as a holographic projector typically includes a light source and a display device, such as a spatial light modulator (SLM), with a collimating lens (or another collimating optical component) located between the light source and the SLM. As will be understood by the reader, the role of the collimating lens (or other collimating optical component) is to cause a generally planar wavefront of light to be incident on the SLM, to illuminate the pixels that display a diffractive pattern such as a hologram.

The inventors have observed—and have explored—a reduced quality of the resulting image (i.e., of the resulting holographic reconstruction) in certain types of image projection systems. In particular, they have observed that in arrangements in which a waveguide (or other pupil expander)—such as a two-dimensional waveguide—is provided between the display device and the viewer, and in particular when those arrangements propagate light encoded by the hologram directly to the viewer's eye, defects can appear in the image that the viewer sees. In other words, the viewer's perception of the resulting image (which is formed in the viewer's eye/brain) often includes defects. Specifically, the image seen by the viewer often includes regions—usually lines, or bands, regularly spaced apart from one another in two dimensions—that are less bright than the rest of the image.

This can be perceived by the viewer as being a two-dimensional grid of reduced-intensity "dark lines", overlapping with the target image. Importantly, the image quality is still measurably good (e.g., as measured by a camera focussed on the image) but the perceived image quality as seen by the eye is diminished, by the presence of the dark lines (or bands). The present inventors have identified the cause of those dark lines and have provided a solution thereto. That solution goes against conventional practice in the field of image projection, as will be understood further from the explanation below.

It is known that image projection systems, such as holographic projection systems, are conventionally designed and arranged with an aim of achieving efficiency. For example, efficiency goals may include some or all of: compactness, reduction in the number of component parts, avoidance of energy/luminance waste, and cost efficiency of both manufacture and operation. Conventionally, therefore, the selection of a collimating lens for an image projection system aims to maximise the power efficiency of the light source, which may for example be a laser source such as a laser diode. A collimating lens in conventional image projection systems therefore typically has a relatively short focal length, which is just enough to generate a light area, which may be described as a light spot, which is large enough to be incident on—i.e., to just cover—the area of the display device (e.g., on the pixels of the SLM) that is to be illuminated, for image projection.

Although power efficiency is improved by using a collimating lens with a relatively short focal length, the illumination of the SLM using such a lens is typically non-uniform—that is, the intensity of the light that is incident on the SLM it's not constant across all pixels, due to the non-uniform (i.e., varying) profile of the light beam. The light beam's intensity profile may vary in at least one dimension, and may vary in two dimensions, which may correspond to first and second dimensions of a display plane that is defined by the pixels of the SLM. The variation in the light intensity may have a symmetrical contour, or profile, in one or both dimensions. For example, it may have a substantially Gaussian profile.

Conventionally, non-uniform illumination of a display device, caused by a varying beam profile, has not been regarded as a significant problem in the technical field of image projection, including holographic image projection. However, the present inventors have found that, surprisingly, it is the root cause of dark line features in certain types of holographic images. Moreover, they have gone against convention ain their solution to the problem of those dark lines, as detailed further below.

In keeping with conventionally accepted understanding, the inventors have observed that non uniform illumination of the pixels of an SLM does not appear to be a root cause of any significant artefacts in the resulting image (i.e., of the resulting holographic reconstruction) in many types of holographic projector. For example, they have identified that, in arrangements in which a hologram is tiled—that is, in which at least one hologram pixel of a hologram is displayed more than once, at a given time, on the display pixels of the SLM—there is no indication of any detrimental effects of the non-uniform illumination. For example, when a hologram is displayed using two or more different, successive tiling schemes (which may be referred to as "dynamic tiling"), image artefacts that might otherwise result from characteristics of the optical components in the imaging system can be averaged out, and thus avoided. The present inventors have further observed that holographic projectors that use tiling and in which the image (i.e., the holographic reconstruction) is formed upstream of the viewer's eye, such as on a light receiving surface such as screen or a diffuser, located upstream of the viewer, typically do not suffer significant negative side effects that might (if present) possibly be attributable to a varying beam profile.

The inventors have however recognised that the varying light intensity profile of the collimated light, illuminating a display device, does in fact have a visible impact on the images that a viewer observes in certain other types of image projection systems. Specifically, the present inventors have identified that a varying beam profile and its resulting non-uniform illumination of a display device can cause the viewer to see darker regions (i.e., "dark lines") in the resulting image, even when the measurable properties of the light/image are still of a high quality, particularly when at least the first, and particularly when both, of the following conditions occur:

1. The wavefront output by the display device (or, by the diffractive pattern displayed by the display device) is replicated by a waveguide or other replicator; and
2. The image is a result of direct-view holography, in which light of the hologram (not light of a holographic reconstruction) is directed into the viewer's eyes, and so the image is formed by the viewer's eye/brain.

The fact that a varying beam profile and its resulting non-uniform illumination of a display device is the root cause of the viewer seeing a grid of dark lines in images formed in such scenarios as set out above, is surprising. Moreover, the solution proposed by the present inventors is not something that would conventionally be adopted in the field of holography.

The inventors have identified that the difference between the high quality of the measurable properties of the light of an image in the condition(s) set out above, and the reduced-quality image (that includes dark lines) as seen by the viewer, is due to the way the human eye/brain's attention is drawn to non-uniformities at the display plane (i.e., at the display device.) Specifically, they have identified that the viewer's eye/brain is highly sensitive to straight-line non-uniformities. Moreover, they have identified the reasons why the conditions above specifically cause the formation of dark lines within a target image, as a result of that human sensitivity. This can be understood further in relation to FIG. 6A et seq and the following description.

As indicated earlier in the present disclosure, British patent application 2118911.3 (published as GB2614286A) is incorporated herein by reference. It discloses a method of calculating a hologram which includes a step of determining a region of a so-called "extended modulator" formed by a hologram replicator. In brief; the extended modulator is created by the provision of an image projection system that includes a two-dimensional waveguide (or, two one-dimensional waveguides), or pupil expander(s)replicator(s), provided downstream of an SLM. The waveguide provides pupil expansion in two dimensions, thus increasing the volume of space (i.e., the "eye-box") within which a viewer (located downstream of the waveguide) can see the image, when a diffractive pattern such as a hologram is displayed and suitably illuminated on the SLM. The presence of the waveguide effectively—from the viewer's perspective—creates a three-dimensional array of replicas of the SLM—which might be referred to as being a "virtual surface"—wherein each replica is offset from each of the respective other replicas, in each of the two directions in which pupil expansion is provided, and wherein each replica is at a slightly different depth, relative to the eye-box, along a third dimension (e.g., along an optical axis of the system.) However, the resulting image that the viewer sees will be at the same depth, regardless of where in the eye box the viewer is located—and, thus, regardless of which optical path the light has taken to the viewer, and so regardless of which replica(s) has/have effectively emitted the light that enters the viewer's eye(s), at any given time.

Figure 6A:
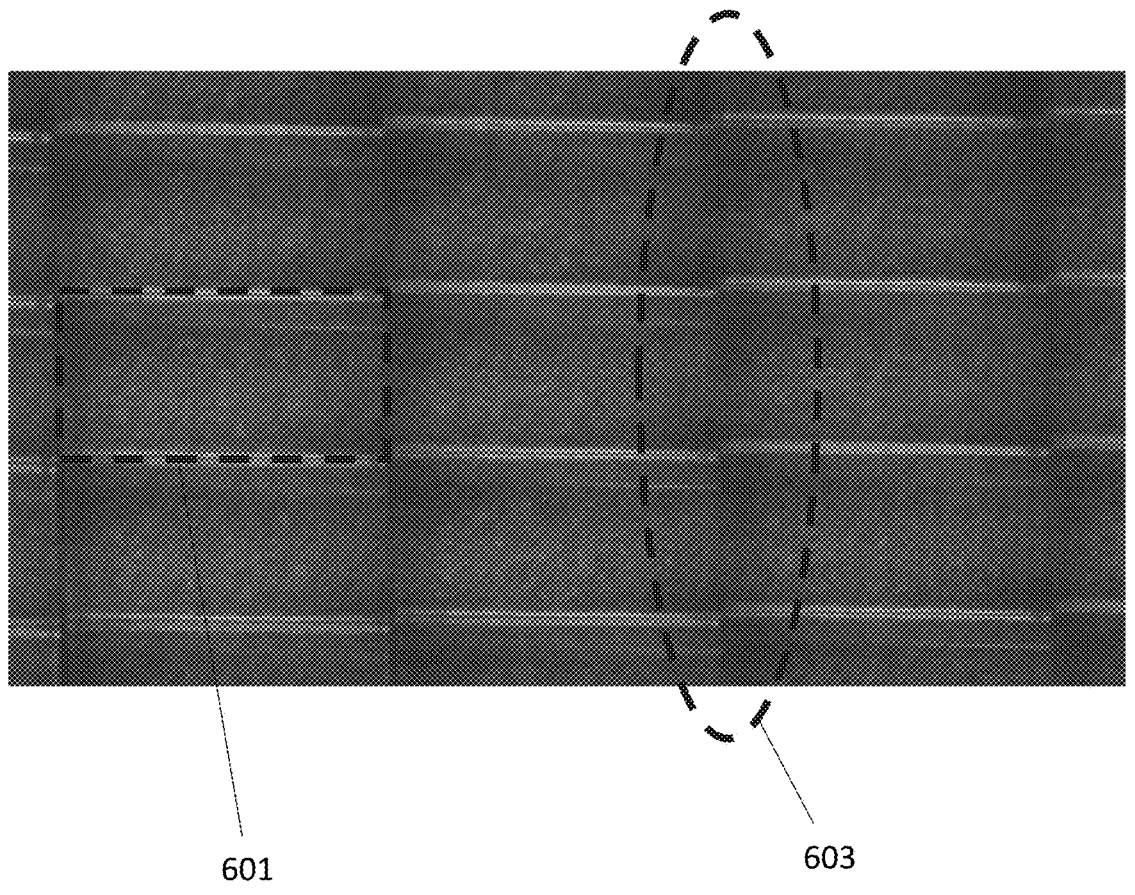
FIG. 6A shows a photographic representation of a conventional extended modulator comprising light from a display device and a plurality of replicas.

FIG. 6A shows a photographic representation of an "extended modulator" or "virtual surface" output by a two-dimensional waveguide, wherein the virtual surface comprises a three-dimensional array formed from a plurality of replicas of the light output by a hologram 601 on a display device (which may be referred to as being replicas of the display device). The display device, which in this example is an SLM, and each replica is shown as being substantially rectangular in cross section, however this is illustrative only. It can be seen that the edges of each replica do not align perfectly with one another, due to the offset created by the two-dimensional pupil expansion as described above. The number and arrangement of the replicas shown in FIG. 6A is illustrative only and should not be regarded as limiting on the present disclosure.

It can also be seen that there are dark areas 603 (which appear as lines, edges, or bands, in the example of FIG. 6A) that are formed between adjacent replicas. The present inventors have identified that those high-contrast dark lines, bands or edges 603 are a result of the periodic replication/repetition of the reduced light intensity at the edges of the display device in an extended modulator. Because the light patterns of the replicas are adjacent to one another, in each of two dimensions, the lower-intensity bands of light around the perimeter of each one combines with the lower-intensity bands of light around the perimeter of the respectively adjacent replica(s), in order to create substantially uniform, extended dark lines in the virtual surface. As will be understood from the foregoing description, conventionally it would not be expected, or predicted, that those areas of reduced light intensity at the virtual surface would have any significant effect on the resulting images, but the present inventors have identified that in fact they do—because the human eye is disproportionately drawn to such uniform, high-contrast features—and have provided a solution thereto.

Figure 7A:
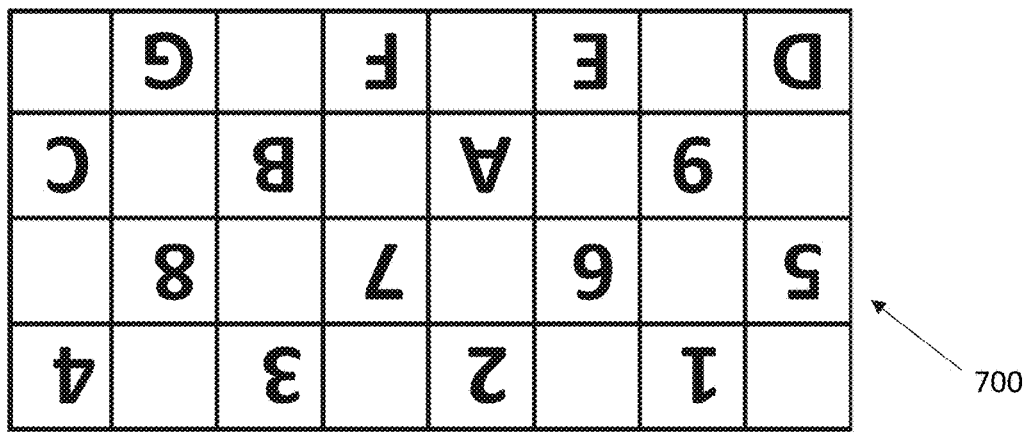
FIG. 7A shows a display device displaying a pattern across its whole pixel area.

FIG. 7A shows an example of a pixelated display device 700 with a pattern displayed thereon. The pattern in this example comprises numbers and letters, with every other pixel of the display device 700 being populated by a single number or letter. The skilled reader will appreciate that this pattern does not "look" like a hologram, but is merely illustrative, and shows the pixels of the display device 700 being populated by a pattern. The display device 700 in this example comprises 32 pixels, but again this is merely an example and should not be regarded as being limiting on the present disclosure. The pattern extends across the whole display device 700, in both its dimensions, such that all the pixels of the display device 700 would have to be illuminated, if the pattern were in fact a hologram and a holographic reconstruction (i.e., an image) was to be formed therefrom.

If the display device of FIG. 7A displayed a hologram that had the same shape and size as the pattern shown therein, and if such a hologram was illuminated in a conventional holographic projection system that included a two-dimensional pupil expander between the display device 700 and the viewer, the outer edges of the hologram would be illuminated by light that is less bright than the light towards the centre of the hologram, due to the varying beam profile of the illuminating light. According to the recognitions made by the present inventors, the resultant "extended modulator", or "virtual surface" created by the pupil expander, with light of multiple adjacent replicas, would look like the virtual surface shown in FIG. 6A, and so the resulting image, as seen/perceived by the viewer, would have dark lines therein, comprising a grid or array of less bright areas, within the target image. Such dark lines would be particularly prominent if the system was a direct-view holographic system, in which light of the hologram is directed into the viewer's eyes.

The inventors have identified that, in order to reduce or eliminate the presence of dark lines in images seen by a viewer, the display device—and, specifically, the "extended modulator" or "virtual surface" formed when a two-dimensional pupil expander is provided between the display device and the viewer—should be uniform and "clean", with as few artefacts present as possible. Moreover, they have identified that a varying beam profile that conventionally would not be regarded as being a significant source of non-uniformity or artefact, is in fact a contributing factor to the dark lines and should be mitigated against.

Figure 6B:
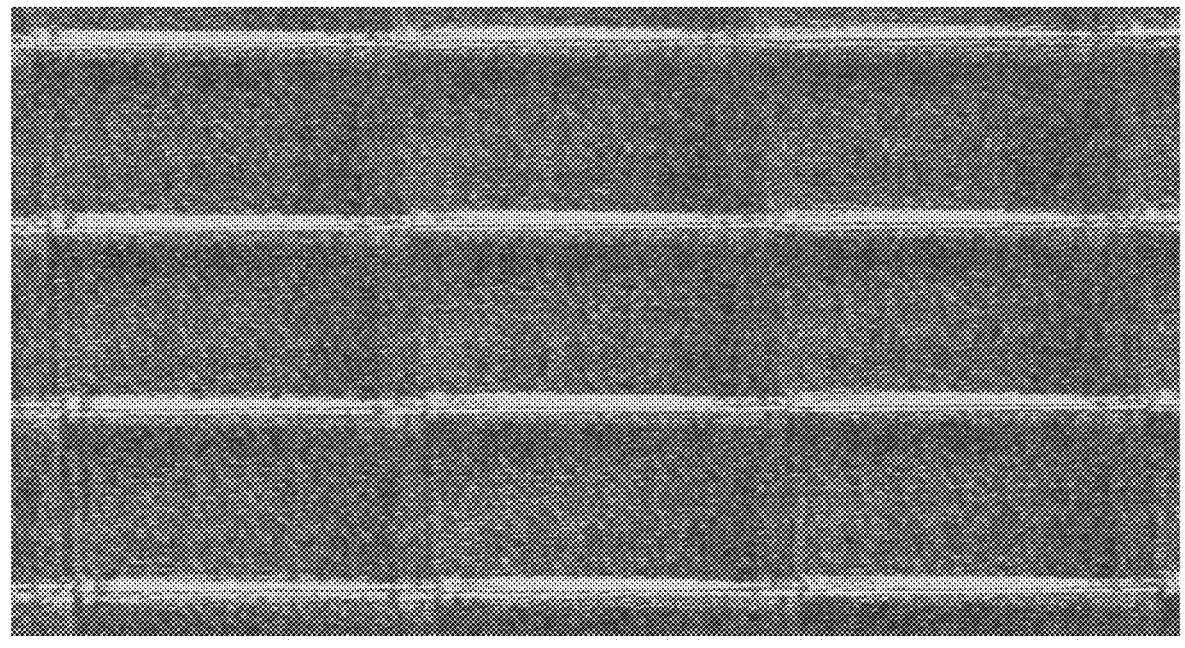
FIG. 6B show a photographic representation of an improved extended modulator comprising light from a display device and a plurality of replicas, without dark lines.
Figure 7B:
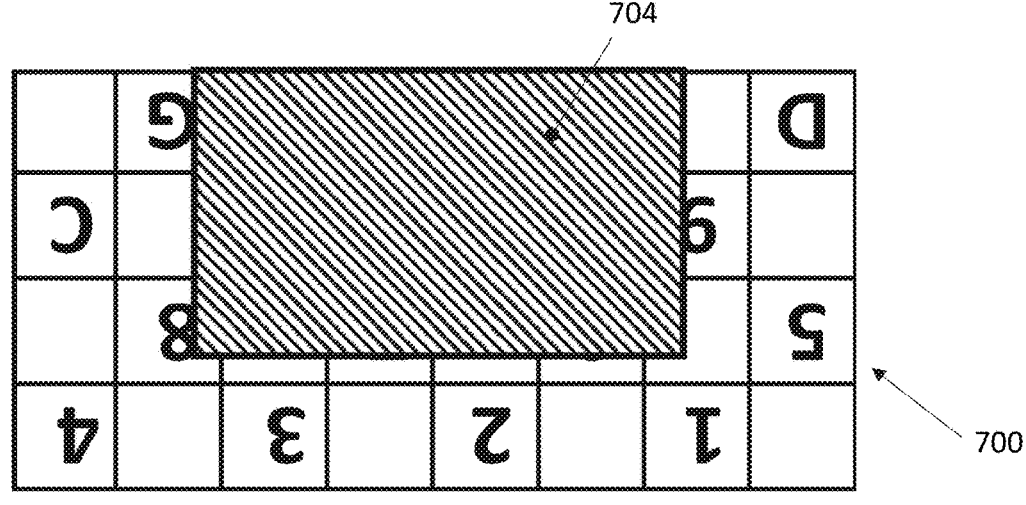
FIG. 7B shows a display device displaying a hologram on less than half of its pixel area.

FIG. 7B represents one possible solution to dark lines, which was proposed by the present inventors, and comprises reducing the separation between replicas, in a virtual surface formed by a two-dimensional pupil expander. This reduced separation effectively makes the light of the replicas overlap with one another. In order to avoid loss of image information, it is not permissible to overlap light from any parts of the display device that display hologram content. Therefore, this solution requires displaying the hologram using only a relatively small area of the display device 700. In other words, the hologram 702 must occupy a display area that is cropped, vis-à-vis the available display area defined by the pixels of the display device 700. In the example of FIG. 7B, less than half of the available display area on the display device 700 is populated by the hologram 702, in order to eliminate dark lines in the corresponding virtual surface, and thus to achieve a reduction/elimination of the dark lines in the resulting image, as seen by a viewer. FIG. 6B shows a photographic representation of a "virtual surface" formed by the cropped hologram 702 of FIG. 7B and its plurality of replicas, using a two-dimensional pupil expander.

Whilst the solution of FIG. 7B does address the problem of dark lines, it does so at a cost of significantly reducing the usage of the number of useable pixels in the display device, which will affect the image resolution and the robustness of the holograms. In at least some cases, this may not be an ideal solution—that is, the advantage of eliminating the dark lines would have to be weighed up against the disadvantage of reduced hologram robustness and reduced image resolution.

Figure 7C:
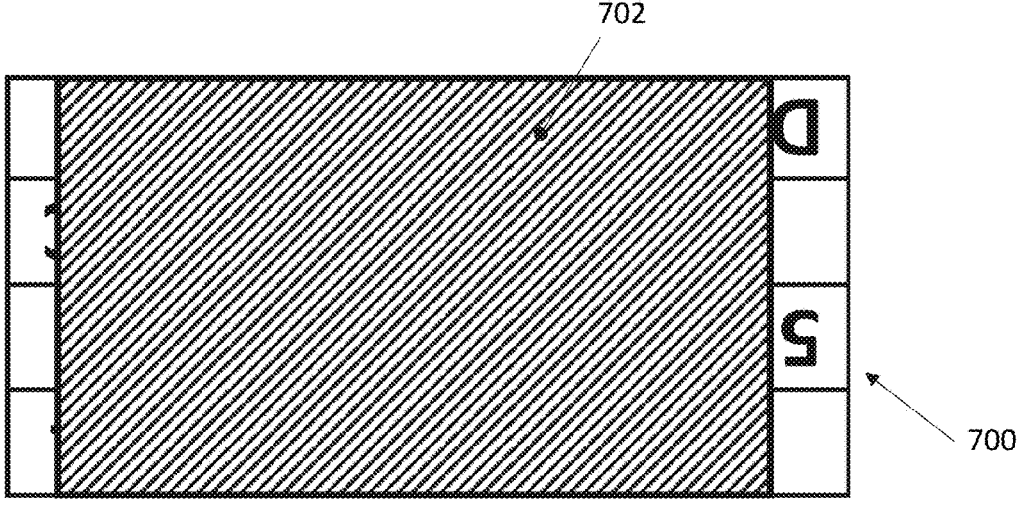
FIG. 7C shows a display device displaying a hologram on most of its pixel area.

With the above in mind, the inventors have identified a further solution, which addresses the problem of dark lines but without significantly compromising on hologram robustness or image resolution. This is illustrated in FIG. 7C. As can be seen therein, the hologram 704 in FIG. 7C occupies most of the available display area defined by the pixels of the display device 700. In the example of FIG. 7c, the hologram occupies approximately 85% of the display area, but the proposed solution can lead to the hologram being displayed on over 90% of the display area. For example, it may be displayed on between approximately 75% and approximately 95% of the available display area. For example, it may be displayed on up to approximately 100% of the available display area. The inventors have identified that it is possible to create a virtual surface of the type shown in FIG. 6B—and therefore addresses the problem of dark lines in the resulting image seen by the viewer—if a further change is made to the image projection system. This further change is not something that would be conventionally considered for an image projection system, since it does not comprise the most efficient possible arrangement in terms of physical compactness and/or light efficiency. However, the inventors have gone against conventional thinking and have identified that (surprisingly) it provides an attractive and successful solution, in terms of balancing potentially conflicting factors, and particularly in terms of balancing at least some of the following factors: the reduction of dark lines in the image; the retention of hologram robustness and good image resolution; physical system compactness; and light/power efficiency.

According to the improved solution, the image projection system includes a collimating lens, arranged to direct light from a light source on to the display device, wherein the collimating lens has a larger focal length than is needed to just illuminate the display area of the display device. In other words, the collimating lens is operable to receive light from a light source and to propagate a light beam, or light spot, that is physically larger in cross section, at the display plane at which the display device is located, than the area defined by the display pixels of the display device. This may be described as the collimating lens "overfilling" the display device with illuminating light. In particular, the present inventors propose significantly overfilling the display device, such that the light that is incident on the pixel display area (and, so, on the hologram or other pattern displayed thereon) is light of a high intensity, and a substantial part of the beam will fall outside the pixel area.

As a result of providing a collimating lens with a focal length that is larger than conventionally required/used in an image projection system, the improved solution provided herein effectively spreads out the varying beam profile of the illuminating light, across the width of (at least most of) the display device, and beyond. This means that the section of the light that is incident on the display device (or, on most of the display device, on which the hologram 704 is displayed) has an intensity that is at or above a pre-defined acceptable threshold, so that dark lines, or bands, are not formed, or are substantially reduced, when light of the hologram 704 is replicated by a two dimensional pupil expander, to form a virtual surface, from which light is directed to the viewer.

For example, the collimating lens may be selected so that the full-width at half maximum (FWHM) of the light profile of the beam is wider than the width of the portion of the display device that displays the hologram 704, wherein that portion occupies most of (for example, but not limited to, at least 75% of) the available display area defined by the pixels of the display device 700. Therefore, light that is of high intensity (e.g., light at just less than half of the maximum intensity) is effectively wasted, as it will fall outside the pixel display area. This is not a conventional approach, but the present inventors have found that the energy/compactness losses incurred are on-balance worth the benefit of the image quality improvement, from the viewer's perspective.

For example, the collimating lens may be selected so that the intensity of the light that is incident upon the portion of the display device that displays the hologram 704—wherein that portion occupies most of the available display area defined by the pixels of the display device 700—is at least 75% of the maximum available intensity of the illuminating light.

For example, the collimating lens may be selected so that the intensity of the light that is incident upon the portion of the display device that displays the hologram 704—wherein that portion occupies most of the available display area defined by the pixels of the display device 700—is at least 90% of the maximum available intensity of the illuminating light.

The image projection system may further be configured to ensure that the maximum intensity of the illuminating light falls on a substantially central point, within the displayed hologram 704, wherein that hologram 704 occupies most of (for example, at least 75% of) the available display area defined by the pixels of the display device 700.

The portion of the display device that displays the hologram 704 may be selected to be concentric with the full display area defined by the pixels of the display device 700—i.e., a central point of the hologram may be substantially co-incident with a central point of the array of pixels. Alternatively, a central point of the hologram may be offset, in one or two dimensions, from a central point of the array of pixels.

The precise selection of the focal length of the collimating lens may vary on a case-by-case basis and may be determined, for example, based on a cost-benefit analysis taking into account factors such as, but not limited to: the reduction/elimination of dark lines in the image; the retention of hologram robustness and good image resolution; physical system compactness—including the volume and/or shape of the available space to house the lens; light/power efficiency; the brightness of the illuminating light incident upon the lens; desired brightness of the resulting image; and so on.

As a general principle, however, the present inventors have identified that the focal length of the lens should be larger than is typically used in known image projection systems, because the beam profile should be wider, at the display plane, than is conventional—for example, it should preferably at least be wider than the display area defined by the pixels of the display device. The beam profile of the light intensity variation may be smooth and symmetrical—for example it may be Gaussian. Therefore, no complex or non-conventional beam shaping methods are required, according to the improved solution provided herein.

For example, the lens may have a focal length that is at least one third longer than the focal length that is actually required to illuminate the whole pixel area. For example, the lens may have a focal length that is half as long again as the focal length that is actually required to illuminate the whole pixel area. For example, the lens may have a focal length that is up to, or more than, twice as long as the focal length that is actually required to illuminate the whole pixel area. Thus, the size of the lens may be significantly larger than the size of a lens that could be used, if the aim was to simply illuminate the whole pixel area. Thus, significant compactness compromises may be made, and significant light losses may be incurred. However, the present inventors have found that these are justified by the advantages of improving the viewer's perception of the resulting images.

Alternatively, the beam profile may be substantially square or "top-hat" shaped, wherein all the light intensity is provided, substantially uniformly, across a central region of the cross section of the beam—which can be made coincident with the hologram 704, displayed on at least a significant portion of the display device—and falls steeply to (approximately) zero at either side of the central region. However, this requires beam shaping techniques that may not be desirable, or indeed possible, to provide at least in some arrangements.

The image projection system may comprise separate light sources of different respective wavelengths (or, may be configured for alternation of the wavelength of output light from a common source)—such as, but not limited to, red/green/blue (RGB) light. In such a system, a different respective focal length of collimating lens may be provided, dependent on the wavelength of the light that is being channelled, at a given time, or within a given sub-section of the image projection system. For example, light of a relatively longer wavelength (e.g., red (R) light) may be collimated by a lens of a longer focal length, relative to the lens that is used to collimate light of a relatively shorter wavelength (e.g., green (G) or blue (B) light). However, for each wavelength of light, the lens selected should have a larger focal length than is typically used in conventional systems, in order to spread out the profile of the light intensity variation, and thus to avoid illumination the hologram, at any time, with light of an intensity that is below an acceptable threshold.

As a result of the solution provided herein, the presence of dark lines in images that are conventionally seen/perceived by a viewer—such as a viewer of a holographic image, in particular as a result of direct holography in an image projection system that includes a pupil expander—can be greatly reduced, and preferably eliminated. This is done in a manner that goes against the convention in the technical field of image projection systems, because it employs a lens (or other collimating optical component) that has a longer focal length—and so is typically physically bigger—than the type of lens conventionally used to direct light from a light source onto a display device, in an image projection system. In fact, the solution The solution provided herein therefore is a result of looking holistically at potentially-conflicting needs and aims for an image projection system—including, but not limited to, a desire to improve viewer perception of an image, maintaining hologram robustness and image resolution, and achieving light/power efficiency, physical compactness and cost-effectiveness—and balancing them in a net-positive way for the viewer. The reduction or elimination of dark lines ensures that a viewer can see an image more clearly, with reduced defects, and therefore the reliability of the image for conveying information to a viewer is improved. This is important, for example, in systems in which safety-critical information may be delivered to the viewer, such as but not limited to image projection systems, such as head-up displays (HUD's) in vehicles.

ADDITIONAL FEATURES

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
an illumination system arranged to illuminate a hologram displayed, on the pixel area of a spatial light modulator (SLM) to form a holographic wavefront;
a waveguide comprising an input port arranged to receive the holographic wavefront and a pair of opposing surfaces arranged to waveguide the holographic wavefront therebetween, wherein a first surface of the pair of opposing surfaces is partially reflective-transmissive such that a plurality of replicas of the holographic wavefront are emitted therefrom;
wherein the illumination system comprises a light source arranged to emit diverging light and a first collimating lens arranged to collimate the light;
and
wherein the illumination system is configured such that the pixel area is contained within an area delineated by a width of the intensity profile of the collimated light at half the maximum intensity of said intensity profile, at the display plane.

2. The holographic projector as claimed in claim 1, wherein the illumination system is configured such that the pixel area is contained within an area delineated by the width at 75% maximum of the intensity profile of the collimated light.

3. The holographic projector as claimed in claim 1, wherein the illumination system is configured such that the pixel area is contained within an area delineated by the width at 90% maximum of the intensity profile of the collimated light.

4. The holographic projector as claimed in claim 1, wherein the first collimating lens has a first focal length F1, wherein said first focal length F1 is greater than a second focal length F2, wherein the second focal length F2 comprises the minimum focal length required to illuminate the entire pixel area using collimated light from a lens located at the position at which the first collimating lens is located.

5. The holographic projector as claimed in claim 4 wherein the ratio of the first focal length F1 to the second focal length F2 is at least approximately 4:3.

6. The holographic projector as claimed in claim 5 wherein the ratio of the first focal length F1 to the second focal length F2 is approximately 2:1.

7. The holographic projector as claimed in claim 1 wherein the illumination system comprises a second collimating lens, wherein the first collimating lens is arranged to collimate light of a first wavelength and wherein the second collimating lens is arranged to collimate light of a second, different wavelength.

8. The holographic projector as claimed in claim 7, wherein the second collimating lens has a third focal length F3, wherein said third focal length F3 is different to the first focal length F1 and is greater than the second focal length F2.

9. The holographic projector as claimed in claim 1 wherein the partially reflective-transmissive first surface of the waveguide comprises an output surface.

10. The holographic projector as claimed in claim 1 wherein the collimated light has a substantially Gaussian profile shape.

11. The holographic projector as claimed in claim 1 wherein the illumination system is configured such that a maximum intensity of the collimated light at the display plane is incident upon a substantially central point of the pixel area.

12. The holographic projector as claimed in claim 1 in which the waveguide is configured to form a virtual surface comprising the plurality of replicas of the holographic wavefront emitted by the SLM, arranged in an array.

13. A method of holographic projection comprising:
   displaying a hologram at a display plane, on the pixel area of a spatial light modulator (SLM);
   emitting diverging light from a light source;

collimating the light using a first collimating lens;
illuminating the displayed hologram with the collimated light, to form a holographic wavefront;
directing the holographic wavefront through a waveguide;
wherein the waveguide comprises an input port arranged to receive the holographic wavefront and a pair of opposing surfaces arranged to waveguide the holographic wavefront therebetween, wherein a first surface of the pair of opposing surfaces is partially reflective-transmissive such that a plurality of replicas of the holographic wavefront are emitted therefrom;
wherein the collimated light has a varying intensity profile, in at least one dimension;
the method further comprising:
arranging the first collimating lens and the SLM such that the pixel area is contained within an area delineated by a width of the intensity profile of the collimated light at half the maximum intensity of said intensity profile, at the display plane.

14. The method of holographic projection as claimed in claim 13 wherein arranging the first collimating lens and the SLM comprises, as an initial step, providing a lens, for use as the first collimating lens, that has a first focal length F1 that is greater than a second focal length F2, wherein the second focal length F2 comprises the minimum focal length required to illuminate the entire pixel area using collimated light from a lens located at the position at which the first collimating lens will be located.

15. The method of holographic projection as claimed in claim 14, wherein the ratio of the first focal length F1 to the second focal length F2 is at least approximately 4:3.

16. The method of holographic projection as claimed in claim 13, wherein the pixel area is contained within an area delineated by the width at 75% maximum of the intensity profile of the collimated light.

17. The method of holographic projection as claimed in claim 13, wherein the pixel area is contained within an area delineated by the width at 90% maximum of the intensity profile of the collimated light.

18. The method of holographic projection as claimed in claim 13, wherein the collimated light has a substantially Gaussian profile shape.

19. The method of holographic projection as claimed in claim 13, wherein a maximum intensity of the collimated light at the display plane is incident upon a substantially central point of the pixel area.

20. The method of holographic projection as claimed in claim 13, wherein the waveguide forms a virtual surface comprising the plurality of replicas of the holographic wavefront emitted by the SLM, arranged in an array.

* * * * *